(12) United States Patent
Xie et al.

(10) Patent No.: US 11,907,122 B2
(45) Date of Patent: Feb. 20, 2024

(54) UPWARD EVICTION OF CACHE LINES

(71) Applicant: Huawei Technologies Co., Ltd., Shenzhen (CN)

(72) Inventors: Yuejian Xie, Sunnyvale, CA (US); Qian Wang, Santa Clara, CA (US); Xingyu Jiang, Palo Alto, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/886,718

(22) Filed: Aug. 12, 2022

(65) Prior Publication Data

US 2022/0382678 A1    Dec. 1, 2022

Related U.S. Application Data

(63) Continuation of application No. PCT/US2020/018246, filed on Feb. 14, 2020.

(51) Int. Cl.
*G06F 12/0802*    (2016.01)

(52) U.S. Cl.
CPC ...... *G06F 12/0802* (2013.01); *G06F 2212/60* (2013.01)

(58) Field of Classification Search
CPC .......... G06F 12/0802; G06F 2212/60
See application file for complete search history.

(56) References Cited

U.S. PATENT DOCUMENTS

| | | | |
|---|---|---|---|
| 9,836,406 B2 | 12/2017 | Leung et al. | |
| 10,152,420 B2 | 12/2018 | Xin | |
| 2006/0218352 A1* | 9/2006 | Shannon | G06F 12/128 711/E12.024 |
| 2007/0204121 A1* | 8/2007 | O'Connor | G06F 12/128 711/122 |
| 2010/0023695 A1* | 1/2010 | Guthrie | G06F 12/0817 711/E12.024 |
| 2014/0019677 A1* | 1/2014 | Chang | G06F 12/0804 711/143 |

(Continued)

OTHER PUBLICATIONS

Arm Limited, "AMBA 5 CHI Architecture Specification," Jun. 12, 2014; Aug. 4, 2017; May 8, 2018.

(Continued)

*Primary Examiner* — Eric T Loonan
(74) *Attorney, Agent, or Firm* — Vierra Magen Marcus LLP

(57) ABSTRACT

The disclosure relates to technology for up-evicting cache lines. An apparatus comprises a hierarchy of caches comprising a first cache having a first cache controller and a second cache having a second cache controller. The first cache controller is configured to store cache lines evicted from a first processor group to the first cache and to down-evict cache lines from the first cache to the second cache. The second cache controller is configured to store cache lines evicted from a second processor group into the second cache, to up-evict a first cache line from the second cache to the first cache in response to an eviction of a second cache line from the second processor group to the second cache, and to provide the up-evicted first cache line from the first cache to the second processor group in response to a request from the second processor group.

20 Claims, 12 Drawing Sheets

(56) References Cited

U.S. PATENT DOCUMENTS

| | | | |
|---|---|---|---|
| 2014/0281239 A1* | 9/2014 | Novakovsky | G06F 12/0837 |
| | | | 711/119 |
| 2017/0177488 A1* | 6/2017 | Leung | G06F 12/0842 |
| 2018/0067856 A1* | 3/2018 | Walker | G06F 12/0888 |
| 2018/0300260 A1* | 10/2018 | Appu | G06F 13/4022 |
| 2019/0042439 A1 | 2/2019 | Drerup et al. | |

OTHER PUBLICATIONS

International Search Report & The Written Opinion of the International Searching Authority dated Oct. 27, 2020, International Application No. PCT/US2020/018246.

Laoutaris, N., et al., "The LCD interconnection of LRU caches and its analysis," Performance Evaluation, vol. 63, No. 7, Jul. 1, 2006.

* cited by examiner

UPWARD EVICTION OF CACHE LINES

CLAIM OF PRIORITY

This application is a continuation of PCT Patent Application No. PCT/US2020/018246, entitled "UPWARD EVICTION OF CACHE LINES", filed Feb. 14, 2020, the entire contents of which is hereby incorporated by reference.

FIELD

The disclosure generally relates to caches in a computing system.

BACKGROUND

A computing system may use a cache memory to improve computing performance. For instance, a computing system may store data that it needs to access more frequently in a smaller, faster cache memory instead of storing the data in a slower, larger memory (e.g., a main memory unit). Accordingly, the computing system is able to access the data quicker to reduce memory access time.

A computing system may have a hierarchy of caches that are ordered in what are referred to herein as cache levels. Typically, the cache levels are numbered from a highest level cache to lowest level cache. There may be two, three, four, or even more levels in the cache hierarchy. The highest level cache is closest to the Central Processing Unit (CPU) and the lowest level cache is closest to main memory. Herein, a convention is used to refer to the highest level cache with the lowest number, with progressively lower levels receiving progressively higher numbers. For example, the highest level cache in the hierarchy may be referred to as cache level 1 (L1). Here, the lower level cache levels may be referred to as L2, L3, L4, etc. Cache level 1 (L1) is typically a small, fast cache near the CPU. The lowest level cache is typically referred to as a last level cache (LLC). The LLC may be just above main memory in the hierarchy.

When a processor needs data (referred to as target data), the processor typically requests the target data from the highest level cache (e.g., L1). If the target data is not in a cache, this is referred to as a cache miss. In the event of a cache miss, the next level cache is typically examined to determine if the target data is at the next level cache. This process is typically repeated until the highest level cache is searched for the target data. If none of the caches have the target data, then the target data is accessed from main memory.

BRIEF SUMMARY

According to one aspect of the present disclosure, there is provided an apparatus comprising a hierarchy of caches comprising a first cache having a first cache controller and a second cache having a second cache controller. The second cache is below the first cache in the cache hierarchy. The apparatus also has a first processor group and a second processor group. The first cache controller is configured to store cache lines evicted from the first processor group into the first cache and to down-evict cache lines from the first cache to the second cache. The second cache controller is configured to store cache lines evicted from the second processor group into the second cache. The second cache controller is configured to up-evict a first cache line from the second cache to the first cache in response to an eviction of a second cache line from the second processor group to the second cache. The second cache controller configured to provide the up-evicted first cache line from the first cache to the second processor group in response to a request from the second processor group for the first cache line.

Optionally, in any of the preceding aspects, the second cache controller is configured to up-evict the first cache line from the second cache to the first cache in response to a determination that utilization of the first cache is below a threshold.

Optionally, in any of the preceding aspects, the second cache controller is further configured to prevent the first cache line in the second cache from being evicted to either a third cache below the second cache in the cache hierarchy or to main memory to allow the first cache line to be up-evicted to the first cache.

Optionally, in any of the preceding aspects, the second cache controller is further configured to place the first cache line onto a pending queue in the second cache to be downward evicted from the second cache. Also, the second cache controller is further configured to at least temporarily prevent the first cache line from being downward evicted from the pending queue in the second cache to allow the first cache line to be up-evicted to the first cache.

Optionally, in any of the preceding aspects, the second cache controller is configured to send a command from the second cache to the first cache to request the first cache to read the first cache line from the second cache in order to up-evict the first cache line from the second cache to the first cache.

Optionally, in any of the preceding aspects, the second cache controller is configured to send the command through a snoop channel between the first cache and the first cache.

Optionally, in any of the preceding aspects, the first cache controller is configured to fetch the first cache line from the second cache to the first cache in response to the first cache receiving the command.

Optionally, in any of the preceding aspects, the second cache controller is further configured to determine whether the first cache line is in the second cache in response to a request for the first cache line from the second processor group. Also, the second cache controller is further configured to send a request to the first cache for the first cache line in response to a determination that the first cache line is not in the second cache.

According to one other aspect of the present disclosure, there is provided a computer-implemented method of up-eviction in a cache hierarchy. The method comprises storing cache lines evicted from a first processor group into a first cache, down-evicting cache lines from the first cache into a second cache below the first cache in the cache hierarchy, and storing cache lines evicted from a second processor group into the second cache. The method also comprises up-evicting a first cache line from the second cache to the first cache in response to an eviction of a second cache line from the second processor group to the second cache. The method also comprises providing the up-evicted first cache line from the first cache to the second processor group in response to a request for the first cache line from the second processor group.

According to still one other aspect of the present disclosure, there is provided a wireless communication device comprising: a transceiver, a first processor group, a second processor group, a first cache that is shared by the first processor group, and a second cache that is shared by the second processor group. The first cache has a first cache controller configured to store cache lines evicted from the first processor group into the first cache and to down-evict cache lines from the first cache to the second cache. The second cache has a second cache controller configured to store cache lines evicted from the second processor group into the second cache. The second cache controller is configured to up-evict a first cache line from the second cache to the first cache in response to an eviction of a second cache line from the second processor group to the second cache. The second cache controller is configured to provide the up-evicted first cache line from the first cache to the second processor group in response to a request from the second processor for the first cache line.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
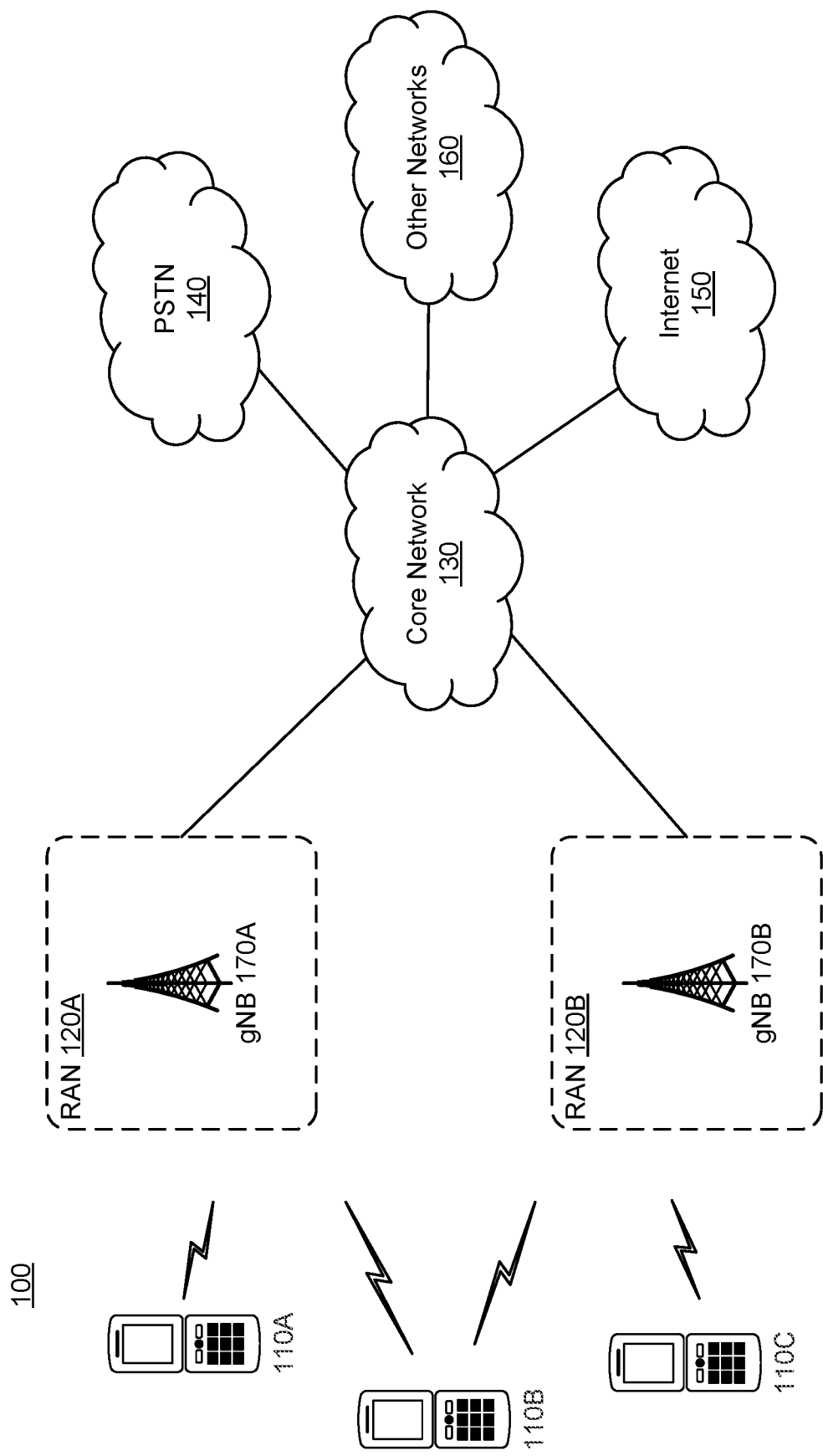
FIG. 1 illustrates a wireless network for communicating data.

The present disclosure will now be described with reference to the figures, which in general relate to upward eviction of cache lines in a computing system. A cache line is a basic unit for cache storage and may also be referred to as a cache block. An upward eviction of a cache line means to evict the cache line from its original cache location to a cache that is closer to the CPU. This is in contrast to a downward eviction that evicts a cache line from its original cache location to a location (cache or main memory) that is further from the CPU. A downward eviction is also referred to herein as a normal eviction.

In one embodiment, each cache has a cache controller. The terms upstream cache controller and downstream cache controller may be used herein. An upstream cache controller controls a cache that is closer to the CPU than the cache controlled by a downstream cache controller. When a cache line is evicted to a target cache (upwards or downwards), there may be a need to select a victim cache line to be removed from the target cache. For a downward eviction, the upstream cache controller may identify the cache line to be evicted from the upstream cache, and the downstream cache controller may identify the victim cache line to be evicted from the downstream cache. Hence, the upstream cache controller does not perform a direct write to the downstream cache. For an upward eviction, the downstream cache controller may identify the cache line to be evicted from the downstream cache, and the upstream cache controller may identify the victim cache line to be evicted from the upstream cache. Hence, in an embodiment, the downstream cache controller does not perform a direct write to the upstream cache. Note that in some cases, there will not be a victim cache line.

One embodiment of a computing system has a hierarchy of caches comprising a first cache having a first cache controller and a second cache having a second cache controller. The second cache is below the first cache in the cache hierarchy. The first cache controller is configured to store cache lines evicted from a first processor group into the first cache and to down-evict cache lines from the first cache to the second cache. The second cache controller is configured to store cache lines evicted from the second processor group into the second cache. The second cache controller is configured to up-evict a first cache line from the second cache to the first cache in response to an eviction of a second cache line from the second processor group to the second cache. The second cache controller configured to provide the up-evicted first cache line from the first cache to the second processor group in response to a request from the second processor group for the first cache line. Up-evicting the first cache line to the first cache is performed in contrast to down-evicting the first cache line to a lower level cache, or to main memory. The up-evicted first cache line may be accessed more quickly from the first cache than from the lower level cache or from main memory.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 2:
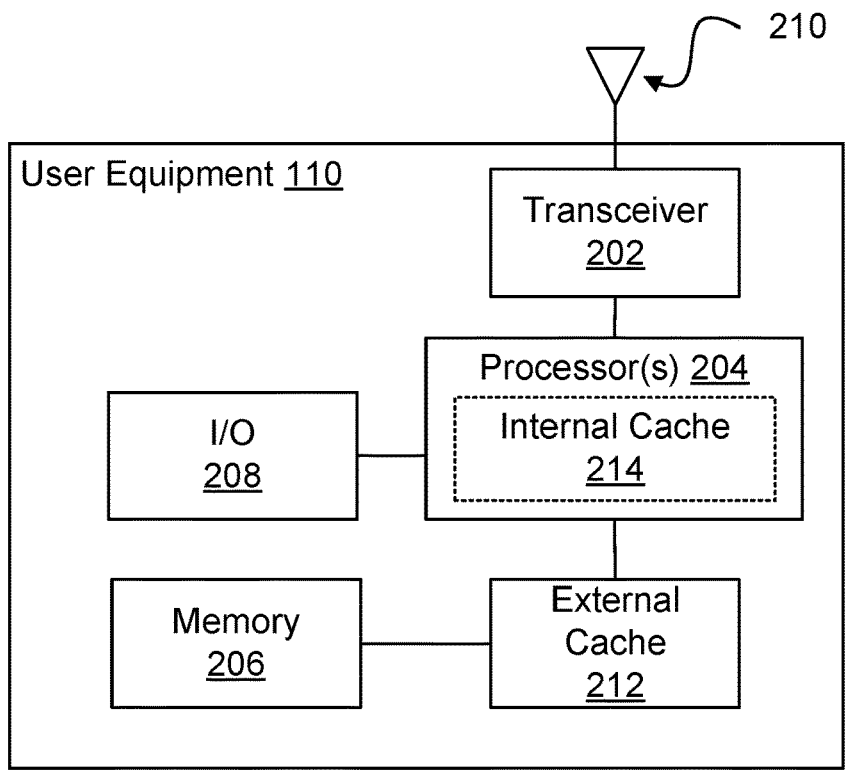
FIG. 2 illustrates example user equipment that may implement the methods and teachings according to this disclosure.
Figure 3:
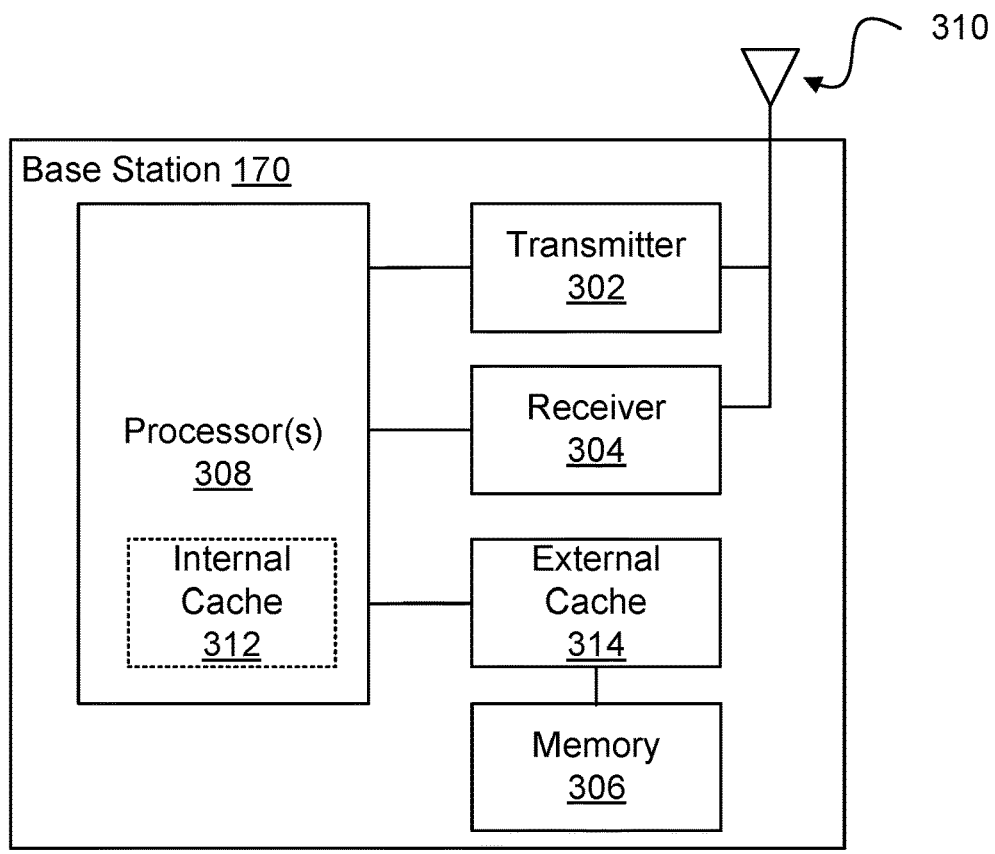
FIG. 3 illustrates example base station that may implement the methods and teachings according to this disclosure.

In some embodiments upwards eviction of cache lines is used in a computing system that is used in a wireless network for communicating data. For example, upwards eviction of cache lines may be used in a wireless communication device such as a cellular telephone. FIGS. 1-3 will be discussed to illustrate example computing systems that may implement embodiments of upwards eviction of cache lines. However, upwards eviction of cache lines can be used in computer systems that are not part of a wireless network for communicating data.

FIG. 1 illustrates a wireless network for communicating data. The communication system 100 includes, for example, user equipment 110A-110C, radio access networks (RANs) 120A-120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A-110C are configured to operate and/or communicate in the system 100. For example, the user equipment 110A-110C are configured to transmit and/or receive wireless signals or wired signals. Each user equipment 110A-110C represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device. In some embodiments, a UE 110 is configured to perform upwards eviction of cache lines.

In the depicted embodiment, the RANs 120A-120B include one or more base stations 170A, 170B (collectively, base stations 170), respectively. Each of the base stations 170 is configured to wirelessly interface with one or more of the UEs 110A, 110B, 110C to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network. In some embodiments, a RAN 120 is configured to perform upwards eviction of cache lines. In some embodiments, a Base Station 170 is configured to perform upwards eviction of cache lines.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the user equipment 110A-110C over one or more air interfaces (not shown) using wireless communication links. The air interfaces may utilize any suitable radio access technology.

It is contemplated that the system 100 may use multiple channel access functionality, including for example schemes in which the base stations 170 and user equipment 110A-110C are configured to implement the Long Term Evolution wireless communication standard (LTE), LTE Advanced (LTE-A), and/or LTE Multimedia Broadcast Multicast Service (MBMS). In other embodiments, the base stations 170 and user equipment 110A-110C are configured to implement UMTS, HSPA, or HSPA+ standards and protocols. Of course, other multiple access schemes and wireless protocols may be utilized.

The RANs 120A-120B are in communication with the core network 130 to provide the user equipment 110A-110C with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the user equipment 110A-110C may include functionality for communicating with different wireless networks over different wireless links using different wireless technologies and/or protocols.

The RANs 120A-120B may also include millimeter and/or microwave access points (APs). The APs may be part of the base stations 170 or may be located remote from the base stations 170. The APs may include, but are not limited to, a connection point (an mmW CP) or a base station 170 capable of mmW communication (e.g., a mmW base station). The mmW APs may transmit and receive signals in a frequency range, for example, from 24 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

FIG. 2 illustrates example user equipment that may implement the methods and teachings according to this disclosure. In one embodiment, the user equipment is configured to perform upward eviction of cache lines as described herein. Upward eviction of cache lines is helpful in meeting performance standards such as 5G. The user equipment (UE) may for example be a mobile telephone, but may be other devices in further examples such as a desktop computer, laptop computer, tablet, hand-held computing device, automobile computing device and/or other computing devices. As shown in the figure, the UE 110 includes at least one processor (which may be referred to as processor(s)) 204. The processor(s) 204 implements various processing operations of the UE 110. For example, the processor(s) 204 may perform signal coding, data processing, power control, input/output processing, or any other functionality enabling the UE 110 to operate in the system 100 (FIG. 1). The processor(s) 204 may include any suitable processing or computing device configured to perform one or more operations. For example, the processor(s) 204 may include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 210. The transceiver 202 is also configured to demodulate data or other content received by the at least one antenna 210. Each transceiver 202 may include any suitable structure for generating signals for wireless transmission and/or processing signals received wirelessly. Each antenna 210 includes any suitable structure for transmitting and/or receiving wireless signals. It is appreciated that one or multiple transceivers 202 could be used in the UE 110, and one or multiple antennas 210 could be used in the UE 110. Although shown as a single functional unit, a transceiver 202 may also be implemented using at least one transmitter and at least one separate receiver.

The UE 110 further includes one or more input/output devices 208. The input/output devices 208 facilitate interaction with a user. Each input/output device 208 includes any suitable structure for providing information to or receiving information from a user, such as a speaker, microphone, keypad, keyboard, display, or touch screen.

In addition, the UE 110 includes at least one memory 206. The memory 206 stores instructions and data used, generated, or collected by the UE 110. For example, the memory 206 could store software or firmware instructions executed by the processor(s) 204 and data used to reduce or eliminate interference in incoming signals. Each memory 206 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

In one embodiment, the processor(s) 204 comprises one or more groups of processors. In one embodiment, the processor(s) 204 comprises processor group I 402(1) and processor group II 402(2) (see FIG. 4). In one embodiment, the user equipment includes cache memory. The cache memory could include what is typically referred to as L1, L2, L3 and/or L4 cache. The higher level caches (e.g., L1, L2) are often embedded into the same chip as a processor and may be considered to be part of the processor, as internal cache 214. Each processor may have its own dedicated internal cache 214. For example, each processor may have its own L1 and L2 cache, which it does not share with another processor. Lower level caches (e.g., L3, L4) are often implemented on a memory chip (e.g., SRAM) separate from the processor(s) and are part of the external cache 212, in an embodiment. In one embodiment, at least part of the external cache 212 is shared by multiple processors. In one embodiment, external cache 212 has an L4 cache that is shared by multiple processors. Memory 206 may be what is commonly referred to as main memory. The external cache 212 is a multi-level cache that operates according to various methods disclosed in this disclosure. The operation of the external cache 212 is helpful in meeting performance standards such as 5G.

FIG. 3 illustrates example base station that may implement the methods and teachings according to this disclosure. In one embodiment, the base station is configured to perform upward eviction of cache lines. As noted above, upward eviction of cache lines is helpful in meeting performance standards such as 5G. As shown in the figure, the base station 170 includes at least one processor (which may be referred to as processor(s)) 308, at least one transmitter 302, at least one receiver 304, one or more antennas 310, an external cache 314, and at least one memory 306. The at least one processor 308 has internal cache 312. The at least one processor 308 implements various processing operations of the base station 170, such as signal coding, data processing, power control, input/output processing, or any other functionality. Each processor 308 includes any suitable processing or computing device configured to perform one or more operations. Each processor 308 could, for example, include a microprocessor, microcontroller, digital signal processor, field programmable gate array, or application specific integrated circuit.

Each transmitter 302 includes any suitable structure for generating signals for wireless transmission to one or more UEs or other devices. Each receiver 304 includes any suitable structure for processing signals received wirelessly from one or more UEs or other devices. Although shown as separate components, at least one transmitter 302 and at least one receiver 304 could be combined into a transceiver. Each antenna 310 includes any suitable structure for transmitting and/or receiving wireless signals. While a common antenna 310 is shown here as being coupled to both the transmitter 302 and the receiver 304, one or more antennas 310 could be coupled to the transmitter(s) 302, and one or more separate antennas 310 could be coupled to the receiver(s) 304. Each memory 306 includes any suitable volatile and/or non-volatile storage and retrieval device(s).

In one embodiment, the processor(s) 308 comprises one or more groups of processors. In one embodiment, the processor 308 comprises processor group I 402(1) and processor group II 402(2) (see FIG. 4). The base station 170 includes cache memory. The cache memory could include what is typically referred to as L1, L2, L3 and/or L4 cache. The higher level caches (e.g., L1, L2) are often embedded into the same chip as a CPU and may be considered to be part of the processor(s) 308. Lower level caches (e.g., L3, L4) are often implemented on a memory chip (e.g., SRAM) separate from the CPU in the external cache 314. The external cache 314 is a multi-level cache that operates according to various methods disclosed in this disclosure. The operation of the external cache 314 is helpful in meeting performance standards such as 5G.

Figure 4:
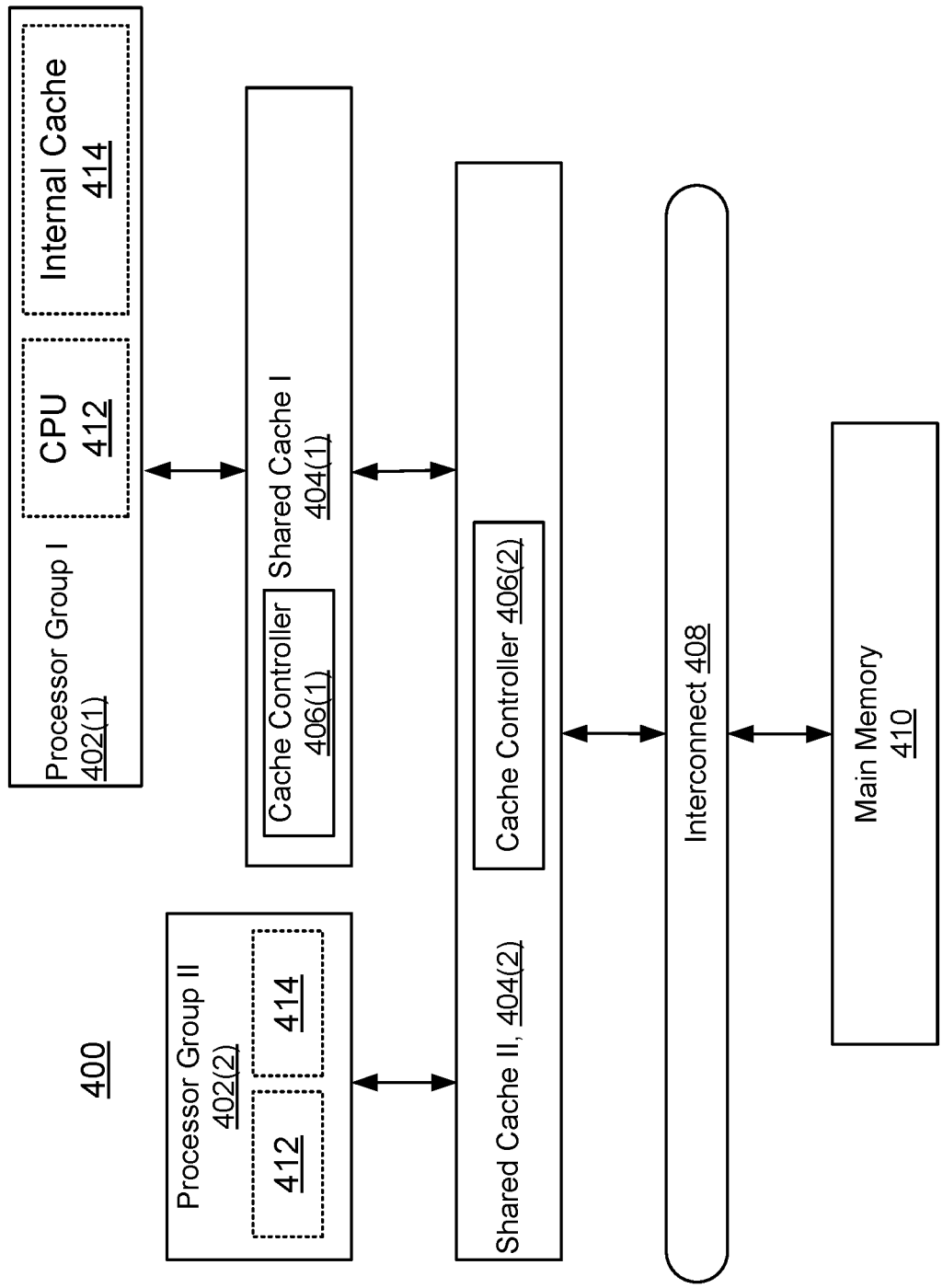
FIG. 4 is a block diagram of one embodiment of a computing system that performs up-eviction.

FIG. 4 is a block diagram of one embodiment of a computing system 400. The computing system 400 is configured to perform upward eviction of cache lines. The computing system 400 includes a first processor group 402(1) and a second processor group 402(2). Herein, the term "group" will be understood to contain one or more of an item. Thus, a processor group contains one or more processors. Each processor contains a central processing unit (CPU) 412 and one or more internal caches 414, in one embodiment. Thus, there could be more than one CPU 412 in a processor group 402. The one or more internal caches 414 within a processor are the highest level caches. For example, a processor may contain L1 cache and L2 cache, which are examples of internal caches 414. Each CPU 412 may have its own internal cache 414, which is not shared with another CPU 412. In one embodiment, the computing system 400 is a heterogeneous computing system, by which is meant that the first processor group 402(1) contains a different type of processor than the second processor group 402(2).

The computing system 400 has a hierarchy of caches. Herein, caches of a hierarchy of caches (or cache hierarchy) are ordered in what are referred to herein as cache levels. The caches are ordered from a highest level to a lowest level. The highest level is closest to the CPU 412. In what is referred to herein as a "normal eviction," data is evicted "downwards" (or "downstream") in a direction to a cache at a lower level in the hierarchy. In one embodiment, the data is "up-evicted" to a cache at a higher level in the hierarchy. An "up-eviction" evicts data in the opposite direction in the cache hierarchy as a "normal eviction."

The system 400 contains external caches, which are external to the processors in the processor groups 402(1), 402(2). The external caches include shared cache I 404(1) and shared cache II 404(2). In one embodiment, shared cache I 404(1) and shared cache II 404(2) are within external cache 212 in UE 100 (see FIG. 2). In one embodiment, shared cache I 404(1) and shared cache II 404(2) are within external cache 314 in base station 170 (see FIG. 3). Shared cache II is at an immediately lower level in the cache hierarchy from shared cache I 404(1). There may be other caches in the cache hierarchy. In one embodiment, first processor group 402(1) contains one or more levels of internal caches 414. In one embodiment, second processor group 402(4) contains one or more levels of internal caches 414. In one embodiment, first processor group 402(1) contains L1 cache and L2 cache for each CPU 412; and second processor group 402(1) contains its own L1 cache and L2 cache for each CPU 412. In this example, the L1 cache and the L2 cache are examples of internal caches. In such an embodiment, shared cache I 404(1) may be referred to as L3 cache, and shared cache II 404(2) may be referred to as L4 cache. In this example, the L3 cache and the L4 cache are examples of external caches.

In a normal eviction, when data is to be evicted from a cache at one level, the data may be evicted to a cache at the immediate lower level. In one embodiment, processor group I 402(1) is configured to evict data from an internal cache 414 (e.g., L2 cache) in processor group I 402(1) to shared cache I 404(1). Data from shared cache I 404(1) may be evicted to shared cache II 404(2). In one embodiment, processor group II 402(2) is configured to evict data from an internal cache 414 (e.g., L2 cache) in processor group II 402(2) to shared cache II 404(2). Data from shared cache II 404(2) may be evicted to main memory 410. Note that interconnect 408 resides between main memory 410 and shared cache II 404(2). This paragraph describes what is referred to herein as a "normal eviction," in which the data is evicted to a cache at the immediate lower level in the cache hierarchy.

In one embodiment, the data is "up-evicted" to a cache at a higher level in the cache hierarchy. Shared cache II 404(2) has a cache controller 406(2) that is configured to "up-evict" cache lines from the shared cache II 404(2) to shared cache I 404(1). Cache controller 406(2) may also be configured to down-evict cache lines. The cache controller 406(2) may be implemented with a state machine. The cache controller 406(2) is implemented in hardware, in one embodiment. The state machine comprises combinational logic and sequential logic, in an embodiment. In one embodiment, no changes are needed to shared cache I 404(1) in order to implement the up-eviction from shared cache II 404(2). For example, cache controller 406(1) in shared cache I 404(1) does not need to be modified in order to achieve up-eviction to shared cache I 404(1). In one embodiment, the up-eviction over-rides the normal eviction. For example, when a cache line is to be evicted from shared cache II 404(2), it may be placed on a pending buffer to be evicted to main memory 410. However, this normal eviction may be over-ridden by up-evicting the cache line to shared cache I 404(1).

Caches at two different levels in the cache hierarchy that are immediately adjacent might or might not have the same access time. In some cases, the access time of a cache is slower than the access time the cache that is immediate above it in the cache hierarchy. In one embodiment, two caches that are immediately adjacent to each other in the cache hierarchy have the same access time. In one embodiment, shared cache I 404(1) and shared cache II 404(2) have about the same access time. In one embodiment, shared cache I 404(1) has faster access time than shared cache II 404(2).

Caches at two different levels in the cache hierarchy that are immediately adjacent might or might not comprise the same type of memory. In one embodiment, the caches at two different levels that are immediately adjacent comprise the same type of memory. In one embodiment, shared cache I 404(1) and shared cache II 404(2) are implemented with the same type of memory. In one embodiment, shared cache I 404(1) and shared cache II 404(2) each comprises eDRAM. In one embodiment, shared cache I 404(1) and shared cache II 404(2) are implemented with different types of memory.

Caches at two different levels in the cache hierarchy that are immediately adjacent reside on two different memory dies, in one embodiment. However, caches at two different levels in the cache hierarchy that are immediately adjacent may reside on the same memory die. In one embodiment, shared cache I 404(1) and shared cache II 404(2) reside on different memory dies. In one embodiment, shared cache I 404(1) and shared cache II 404(2) reside on the same memory die.

Figure 5:
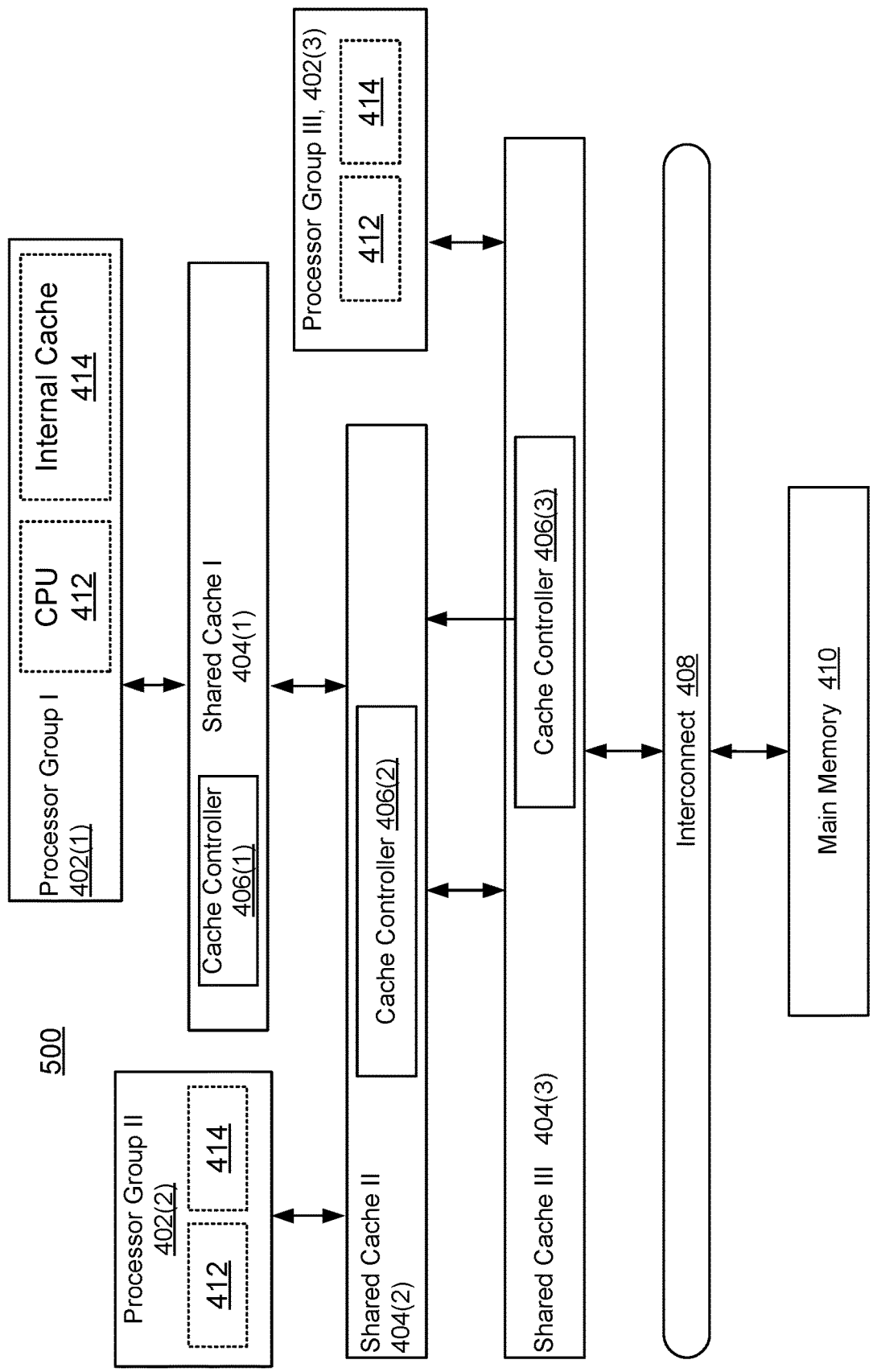
FIG. 5 is a block diagram of another embodiment of a computing system that performs up-eviction.

FIG. 5 is a block diagram of another embodiment of a computing system 500. The computing system 500 is configured to perform upward eviction of cache lines. Computer system 500 has some elements in common with computer system 400, but adds processor group III 402(3) and shared cache III 404(3). Processor group III 402(3) has one or more CPUs 412, each with one or more internal caches 414, in one embodiment. In one embodiment, a processor in processor group III 402(3) includes an L1 cache and an L2 cache for each CPU 412, which in this example are internal caches 414. The computer system 500 is configured to evict data from an internal cache 414 in processor group III 402(3) to shared cache III 404(3). Share cache III 404(3) is an external cache.

Shared cache 1404(1) is above shared cache II 404(2), which is above shared cache III 404(3), in the cache hierarchy. Thus, in what is referred to herein as a normal eviction, cache lines are evicted from shared cache I 404(1) to shared cache II 404(2). Also, in normal eviction, cache lines are evicted from shared cache II 404(2) to shared cache III 404(3).

The computer system 500 is configured to up-evict cache lines from shared cache III 404(3) to shared cache II 404(2). In one embodiment, the cache controller 406(3) in shared cache III 404(3) is configured to up-evict cache lines to shared cache II 404(2). Cache controller 406(3) may also be configured to down-evict cache lines. In one embodiment, a cache line that is scheduled to be evicted from shared cache III 404(3) to main memory 410 is instead up-evicted to shared cache II 404(2). In one embodiment, no changes are needed to shared cache II 404(2) in order to implement the up-eviction from shared cache III 404(3) to shared cache II 404(2). Each state machine comprises combinational logic and sequential logic, in an embodiment. Cache controller 406(3) may be implemented in hardware. In one embodiment, cache controller 406(3) comprises combinational logic and sequential logic.

The computer system 500 is optionally configured to up-evict cache lines from shared cache II 404(2) to shared cache I 404(1), as described in connection with computer system 400 in FIG. 4. In one embodiment, a cache line that is scheduled to be evicted from shared cache II 404(2) to shared cache III 404(3) is instead up-evicted to shared cache I 404(1). In one embodiment, no changes are needed to shared cache I 404(1) in order to implement the up-eviction from shared cache II 404(2) to shared cache 1404(1).

In some embodiments, computer systems 400 and/or 500 are substantially compliant with ARM AMBA (Advanced Microcontroller Bus Architecture) specifications, which are an open interface standard, used for on-chip communication, data transfer and connectivity. In one embodiment, various messages in the ABMA CHI Architecture are passed between nodes in computer systems 400 and/or 500. The term node in this context refers to a processor in one of the processor groups 402, logic in one of the caches 404, etc. Such messages may be passed between a processor and a cache, between two caches, etc. An ABMA CHI Architecture is described in AMBA 5 CHI Architecture Specification (ARM Limited, May 8, 2018). However, the messages passed within computer systems 400 and/or 500 are not limited to those in the ABMA CHI Architecture. Moreover, neither computer system 400 nor 500 is required to be compliant with the ABMA CHI Architecture.

Figure 6:
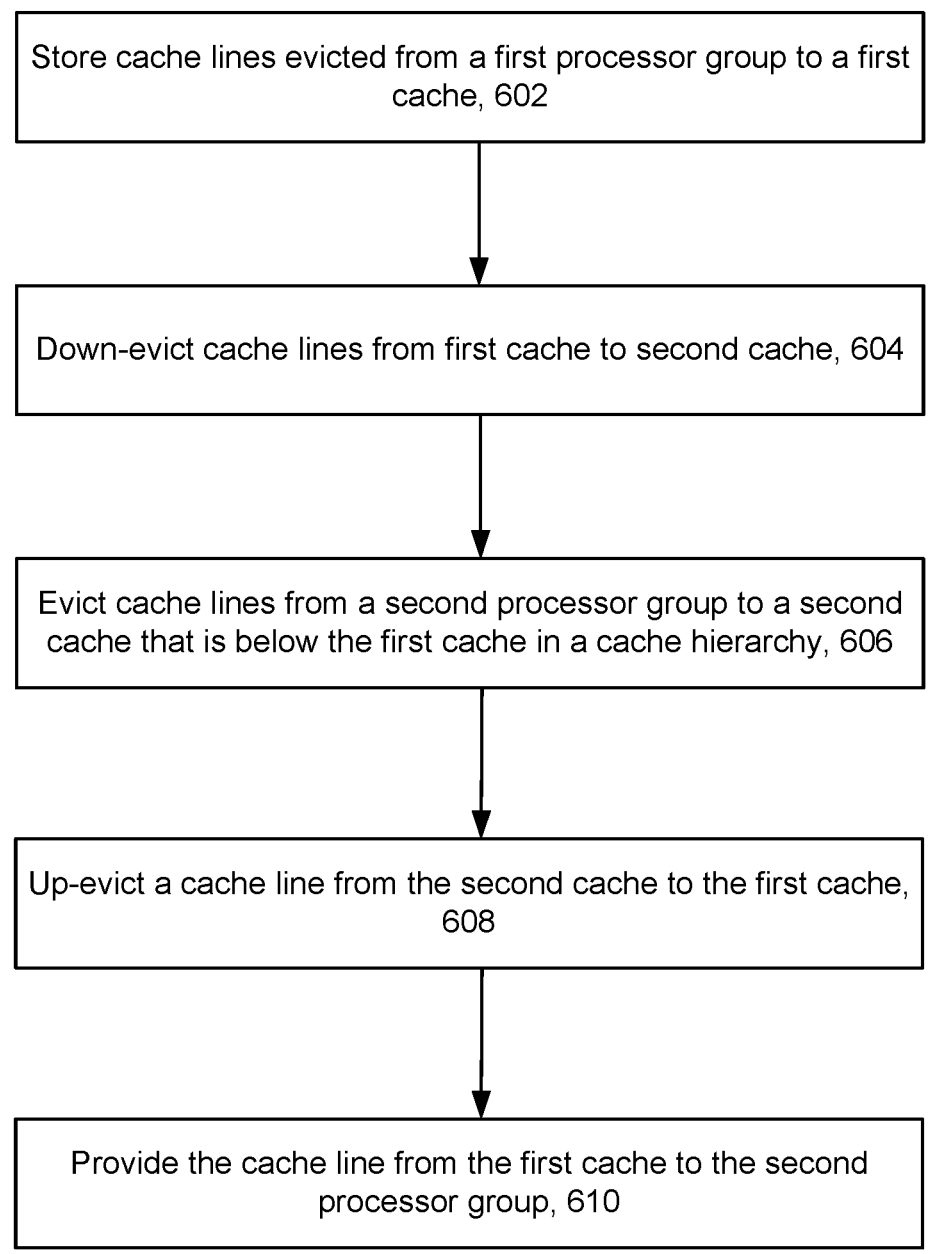
FIG. 6 is a flowchart of one embodiment of a process of up-evicting cache lines in a computer system.

FIG. 6 is a flowchart of one embodiment of a process 600 of up-evicting cache lines in a computer system. The process 600 may be practiced in computer system 400 or 500, but is not limited thereto. In one embodiment, the process 600 is implemented in UE 110. In one embodiment, the process 600 is implemented in base station 170. Reference will be made to elements in FIGS. 4 and 5 when discussing process 600; however, process 600 is not limited to computer system 400 or 500.

Process 600 refers to a first processor group and a second processor group. Process 600 also refers to a first cache and a second cache. In one embodiment, the first cache and the second cache are external caches. In one embodiment of computer system 400, the first processor group is processor group I 402(1), the second processor group is processor group II 402(2), the first cache is shared cache I 404(1), and the second cache is shared cache II 404(2). In one embodiment of computer system 500, the first processor group is processor group II 402(2), the second processor group is processor group III 402(3), the first cache is shared cache II 404(2), and the second cache is shared cache III 404(3). In another embodiment of computer system 500, computer system 400, the first processor group is processor group I 402(1), the second processor group is processor group II 402(2), the first cache is shared cache I 404(1), and the second cache is shared cache II 404(2

Step 602 includes storing cache lines that are evicted from a first processor group to a first cache. In one embodiment of computer system 400, cache lines are evicted from internal cache 414 in processor group I 402(1) to a shared cache I 404(1). In one embodiment of computer system 500, cache lines are evicted from internal cache 414 in processor group II 402(2) to shared cache II 404(2). In another embodiment of computer system 500, cache lines are evicted from internal cache 414 in processor group I 402(1) to a shared cache I 404(1).

In one embodiment, step 602 includes a processor sending a message to a cache that a cache line is being evicted from the processor. In one embodiment, the message is a CHI Request message in the ARM CHI Architecture. The message in step 602 could be a message other than a CHI Request message in the ARM AMBA Architecture. In one embodiment, the message is received and processed by a cache controller in the cache. Step 602 may also include the cache controller adding the cache line that was evicted from the processor group to cache storage in the cache.

Step 604 includes down-evicting cache lines from the first cache to the second cache.

Step 606 includes storing cache lines that are evicted from a second processor group to a second cache. The second cache is below the first cache in the cache hierarchy. In one embodiment of computer system 400, data is evicted from internal cache 414 in processor group II 402(2) to shared cache II 404(2). In one embodiment of computer system 500, data is evicted from internal cache 414 in processor group III 402(3) to shared cache III 404(3). In another embodiment of computer system 500, data is evicted from internal cache 414 in processor group II 402(2) to shared cache II 404(2).

In one embodiment, step 606 includes a processor sending a message to a cache that a cache line is being evicted from internal cache 414 in the processor. In one embodiment, the message is a CHI Request message in the ARM CHI Architecture. The message in step 604 could be a message other than a CHI Request message in the ARM AMBA Architecture. In one embodiment, the message is received and processed by a cache controller in the cache. Step 604 may include the cache controller adding the cache line that was evicted from the processor group to cache storage in the cache.

Step 608 includes up-evicting a cache line from the second cache to the first cache. In one embodiment of computer system 400, data is up-evicted from shared cache II 404(2) to shared cache I 404(1). In one embodiment of computer system 500, data is up-evicted from shared cache III 404(3) to shared cache II 404(2). In another embodiment of computer system 500, data is up-evicted from shared cache II 404(2) to shared cache 1404(1).

In one embodiment, up-evicting the cache line includes over-riding a normal downward eviction. With respect to one embodiment of computer system 400, up-evicting the cache line includes over-riding a normal downward eviction from shared cache II 404(2) to main memory. With respect to one embodiment of computer system 500, up-evicting the cache line includes over-riding a normal downward eviction from shared cache III 404(2) to main memory 410. With respect to another embodiment of computer system 500, up-evicting the cache line includes over-riding a normal downward eviction from shared cache II 404(2) to shared cache III 404(3).

Step 608 may include placing the first cache line onto a pending queue in the second cache to be downward evicted from the second cache. Additionally, a cache controller may prevent the first cache line from being downward evicted from the pending queue in the second cache to allow the first cache line to be up-evicted to the first cache. In one embodiment, a cache controller in the second cache sends a command from the second cache to the first cache to request the first cache to read the first cache line from the pending queue. A cache controller in the first cache reads the cache line from the pending queue in order to complete the up-eviction of the cache line.

Step 610 includes providing the cache line from the first cache to the second processor group in response to a request from the second processor group. In one embodiment of computer system 400, the cache line is provided from shared cache I 404(1) to processor group II 402(2). In one embodiment of computer system 500, the cache line is provided from shared cache II 404(2) to processor group III 402(3). In another embodiment of computer system 500, the cache line is provided from shared cache I 404(1) to processor group II 402(2).

Step 610 may include a cache controller in the second cache that receives the request from the processor determining whether the first cache line is in the second cache. The cache controller may send a request to the first cache for the first cache line in response to a determination that the first cache line is not in the second cache but is in the first cache. Thus, the cache controller may then provide the first cache line to the processor after it is obtained from the first cache.

Figure 7:
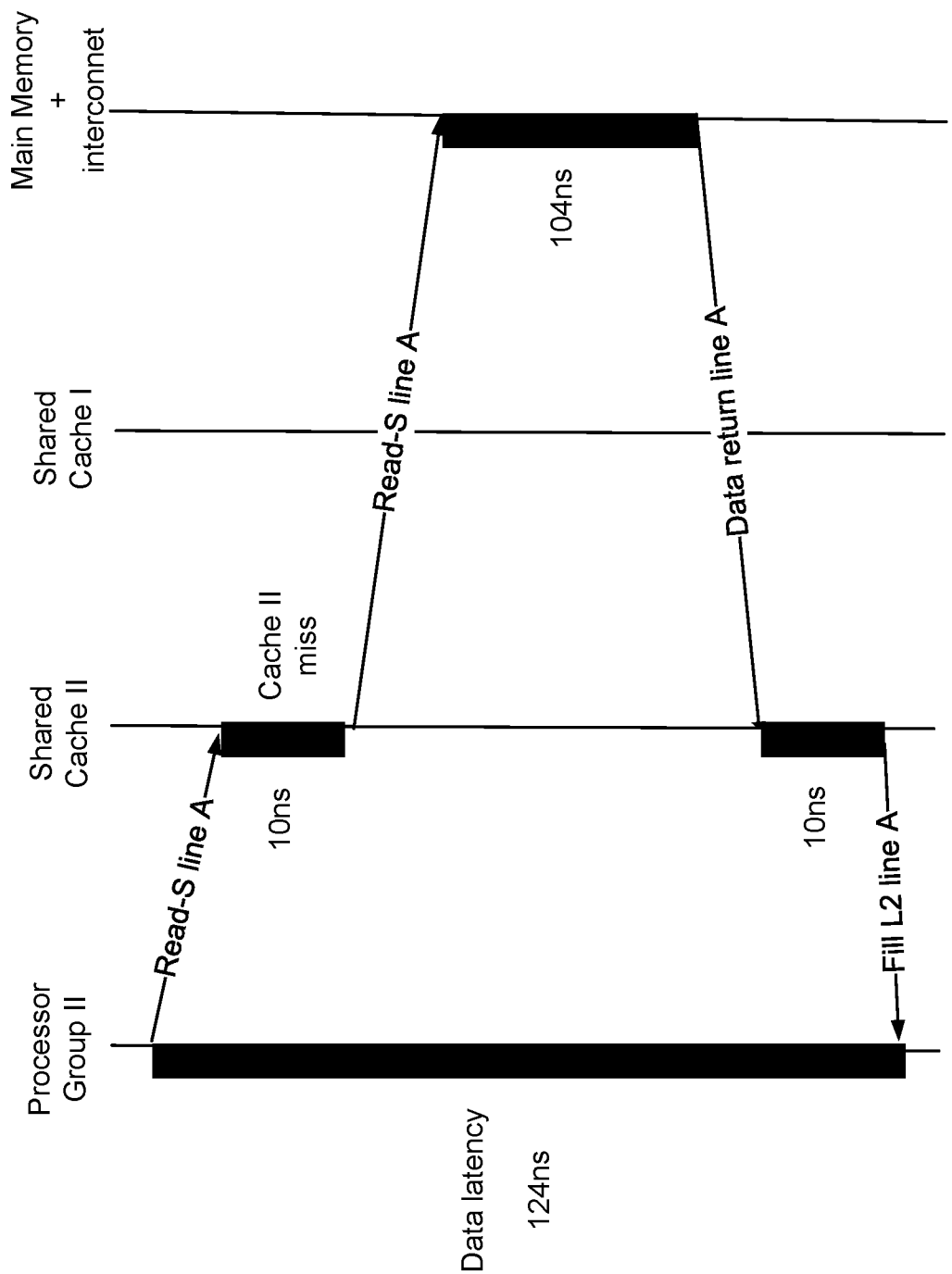
FIGS. 7 and 8 are diagram that indicate potential time savings that result from obtaining a cache line that was up-evicted.
Figure 8:
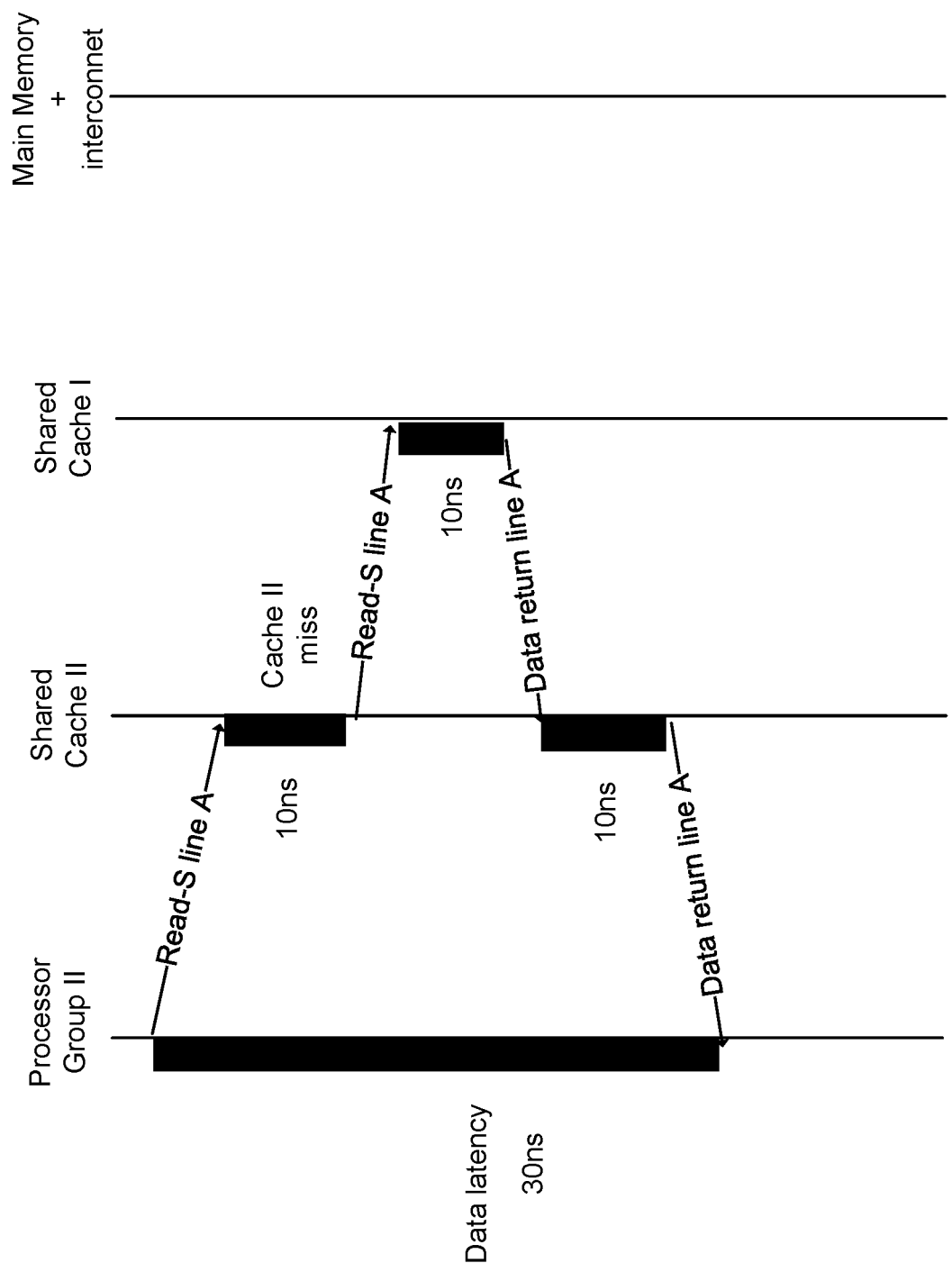

FIGS. 7 and 8 are diagram that indicate potential time savings that result from obtaining a cache line that was up-evicted. FIGS. 7 and 8 provide example times for the computer system 400 in FIG. 4. The times depicted in FIGS. 7 and 8 are for purpose of illustration. Computer system 400 is not limited to the times shown in FIGS. 7 and 8. For each diagram it is assumed that the data is not originally within internal cache in the processor group.

FIG. 7 depicts a case in which up-eviction is not used, and the data (cache line A) sought by processor group II 402(2) is found in main memory 410. Processor group II 402(2) looks for the cache line A in shared cache II 404(2), which results in a cache miss taking 10 nanoseconds (ns). Next, the data is requested from main memory 410, which returns the data to shared cache II 404(2) taking another 104 ns. Finally, cache line A is provided from shared cache II 404(2) to processor group II 402(2), which consumes another 10 ns. Thus, a total of 124 ns is needed to provide the data to processor group II 402(2).

FIG. 8 depicts a case in which an embodiment of up-eviction is used, and the data (cache line A) sought by processor group II 402(2) is found in shared cache I 404(1). Processor group II 402(2) looks for the cache line A in shared cache II 404(2), which results in a cache miss taking 10 nanoseconds (ns). Next, the data is requested from shared cache I 404(1), which returns the data to shared cache II 404(2) taking only 10 ns. Finally, cache line A is provided from shared cache II 404(2) to processor group II 402(2), which consumes another 10 ns. Thus, only 30 ns is needed to provide the data to processor group II 402(2). In this example, 94 ns is saved relative to the example of FIG. 7. This example is for purpose of illustration, the time savings will depend on the access times of the various caches and main memory.

Figure 9:
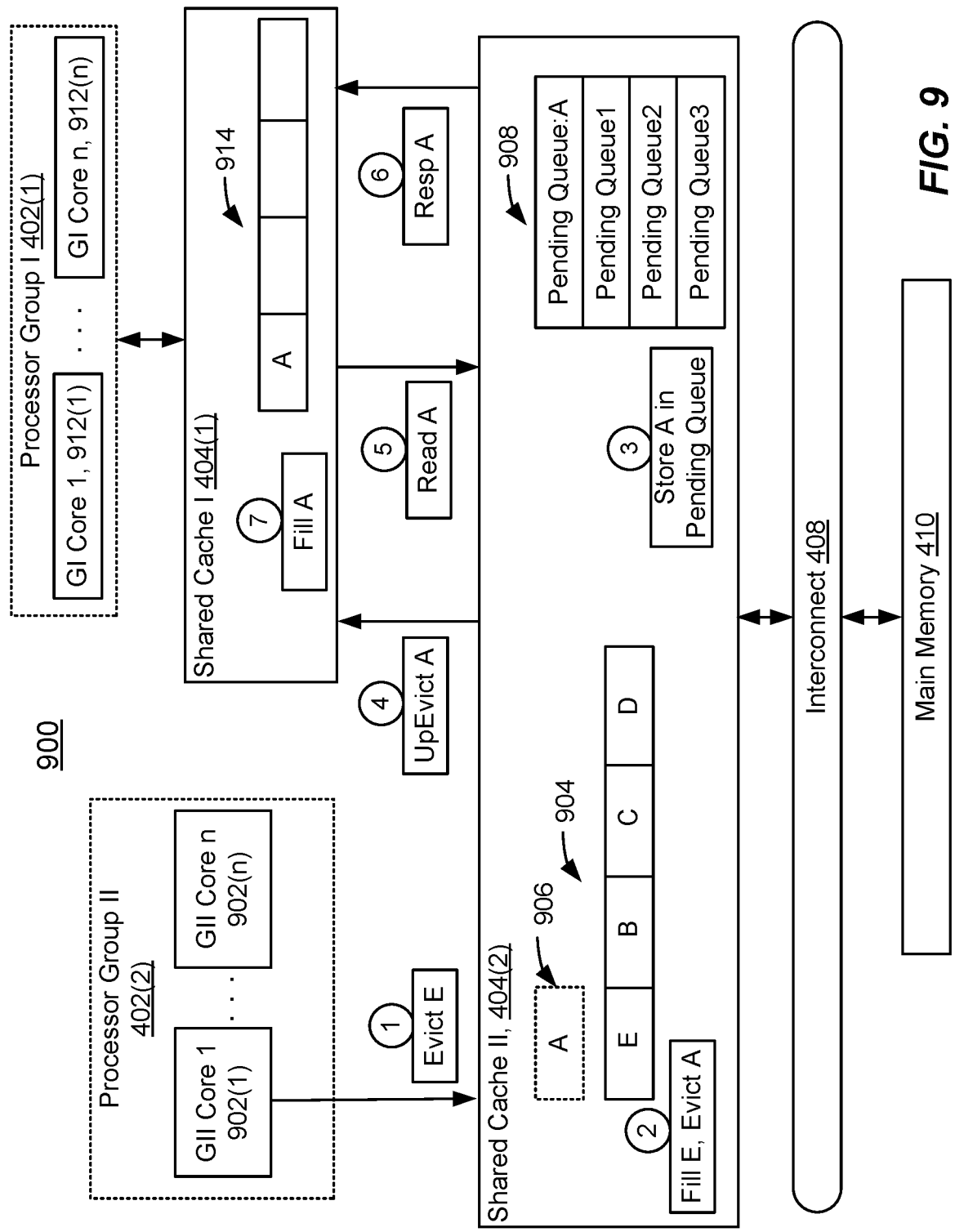
FIG. 9 is a block diagram of one embodiment of a computer system that performs up-eviction.

FIG. 9 is a block diagram of one embodiment of a computer system 900 that performs up-eviction. Computing system 900 is similar to computing system 400 (see FIG. 4), hence common elements will not be described in detail. Processor group I 402(1) has a number of computing cores (GI core 1, 912(1) . . . GI core n 912(n)). Processor group II 402(2) also has a number of computing cores (GII core 1, 902(1) . . . GII core n 902(n)). Each computing core may comprise internal cache, such as L1 and L2 cache.

Shared cache II 404(2) has cache storage 904. In this example, four cache lines are depicted. As will be discussed in more detail below, the cache storage 904 shows a state in which the cache storage 904 contains cache lines E, B, C, and D, with cache line A 906 having been evicted from cache storage 904. Only four cache lines are shown in cache storage 904 for ease of depiction. Typically, there will be many more than four cache lines.

Shared cache II 404(2) has a pending queue 908, which is storage for cache lines that have recently been evicted from cache storage 904. These cache lines are candidates to be evicted to main memory 410. Cache line A is depicted on the pending queue 908 to indicate that after it has been evicted from cache storage 904 it is placed on the pending queue 908. However, as will be discussed more fully below, cache line A will be up-evicted to shared cache I 404(1) rather than a normal eviction to main memory 410.

Shared cache I 404(1) has cache storage 914. As will be explained below, cache line A is up-evicted from shared cache II 404(2) into cache storage 914 in shared cache I 404(1). The path of up-eviction is from cache storage 904 to pending queue 908 to cache storage 904, in an embodiment.

FIG. 9 shows seven circles with the numbers 1 to 7 therein to indicate a sequence of events that is performed by the computer system 900 during up-eviction of cache line A. This up-eviction will be discussed in more detail in connection with the flowchart of FIG. 10.

Figure 10:
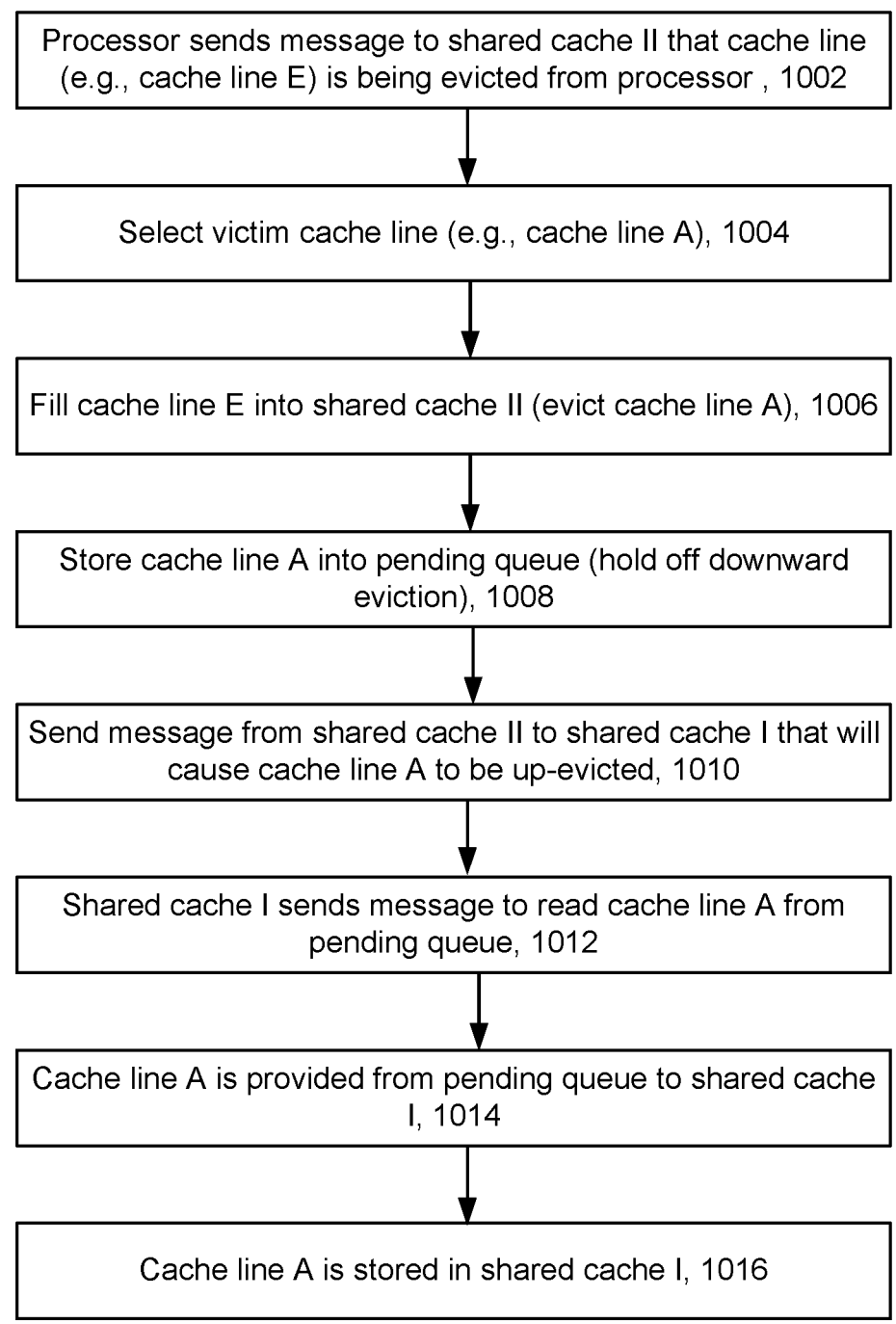
FIG. 10 is a flowchart of one embodiment of a process of performing up-eviction of a cache line.

FIG. 10 is a flowchart of one embodiment of a process 1000 of performing up-eviction of a cache line. The process 1000 will be described with respect to the computing system 900 of FIG. 9.

Step 1002 includes a processor in processor group II 402(2) sending a message to shared cache II that a cache line is being evicted from the processor. This is represented in FIG. 9 by the circle labeled "1", as well as the box connected thereto that says "Evict E". In this example, cache line E is being evicted from processor group II 402(2). In this example, it is GII core 1 902(1) that sends the message to shared cache II 404(2). Shared cache II 404(2) is defined as being downstream from processor group II 402(2). In one embodiment, the message is a CHI Request message in the ARM CHI Architecture. In an embodiment using a CHI Request message, the processor may be referred to as a Request Node, and shared cache II 404(2) is defined as a downstream cache relative to processor group II 402(2). The message in step 1002 could be a message other than a CHI Request message in the ARM AMBA Architecture. The message is received and processed by a cache controller in shared cache II 404(2), in an embodiment.

Step 1004 includes selecting a victim cache line from cache storage 904 in shared cache II 404(2). In the example in FIG. 9, cache line A 906 is selected as the victim. Any technique may be used to select the victim including, but not limited to, round robin, least recently used (LRU), etc. Note that for simplicity only four cache lines are depicted in cache storage 904. Also, for the sake of discussion, it is assumed that the cache storage 904 is full; therefore, there is a need to select a victim cache line. In one embodiment, step 1004 is performed by a cache controller in shared cache II 404(2).

Step 1006 includes filling cache line E into cache storage 904 in shared cache II 404(2). This includes writing cache line E into the physical location that was occupied by cache line A, in an embodiment. Step 1006 is represented in FIG. 9 by the circle labeled "2", as well as the box connected thereto that says "Fill E, Evict A." Cache line A 906 is depicted in dashed lines adjacent to cache storage 904 to indicate that cache line A has been evicted from cache storage 904 after step 1006. In one embodiment, step 1006 is performed by a cache controller in shared cache II 404(2).

Step 1008 includes storing cache line A into the pending queue 908 in the shared cache II 404(2). Step 1008 is represented in FIG. 9 by the circle labeled "3", as well as the box connected thereto that says "Store A in pending queue." At this time cache line A is stored on pending queue 908. Pending queue 908 is depicted as containing cache line A to represent the condition of pending queue 908 after step 1008. In one embodiment, step 1008 is performed by a cache controller in shared cache II 404(2).

In one embodiment, step 1008 also includes preventing cache line A from being evicted from pending queue 908 down to main memory 410. In one embodiment, logic in the shared cache II 404(2) will attempt to send data (e.g., cache lines) in the pending queue 908 down to main memory 410. However, this downward eviction is delayed, which will allow cache line A to be up-evicted to shared cache I 404(1), as described in later steps of process 1000.

Step 1010 includes sending a message from shared cache II 404(2) to shared cache I 404(1) that will cause cache line A to be up-evicted. Note that shared cache I 404(1) is at a level above shared cache II 404(2) in the cache hierarchy. Step 1010 is represented in FIG. 9 by the circle labeled "4", as well as the box connected thereto that says "UpEvict A." In one embodiment, the message is a recommendation that the recipient obtain a copy of cache line A. In other words, the cache controller in shared cache II 404(2) recommends to the cache controller in shared cache I 404(1) that cache line A be obtained from the pending queue 908. The message may be sent through a snoop channel. In one embodiment, the message is sent by a snoop filter, which for purpose of discussion will be considered to be part of the cache controller. In one embodiment, the message that is sent in step 1010 is a SnpStashShared command in the ARM AMBA Architecture. A SnpStashShared command is a snoop request the recommends that the recipient (referred to as the Snoopee) obtain a copy of the cache line. The message in step 1010 could be a message other than a SnpStashShared command in the ARM AMBA Architecture. In one embodiment, step 1010 is performed by the cache controller in shared cache II 404(2).

Step 1012 includes the shared cache I 404(1) sending a message to read cache line A from the pending queue. Step 1012 is represented in FIG. 9 by the circle labeled "5", as well as the box connected thereto that says "Read A." In one embodiment, the message that is sent in step 1012 is a ReadShared command in the ARM AMBA Architecture. Communication between nodes is channel based in the ARM AMBA Architecture. The ReadShared command may be sent on a channel designated as TXREX in the ARM AMBA Architecture. A ReadShared command is a read request to an address region. Data is to be provided in response to the ReadShared command. The message in step 1012 could be a message other than a ReadShared command in the ARM AMBA Architecture. In one embodiment, step 1012 is performed by the cache controller in shared cache I 404(1).

Step 1014 includes cache line A being provided from the pending queue 908 to shared cache I 404(1). Step 1014 is represented in FIG. 9 by the circle labeled "6", as well as the box connected thereto that says "Resp A." Step 1014 is performed in response to the message in step 1012. In one embodiment, step 1012 is performed by the cache controller in shared cache II 404(2).

Step 1016 includes storing cache line A in the cache storage 914 in shared cache I 404(1). Step 1016 is represented in FIG. 9 by the circle labeled "7", as well as the box connected thereto that says "Fill A." Cache storage 914 is depicted as containing cache line A to represent the condition of cache storage 914 after step 1016.

If the cache storage 914 in shared cache I 404(1) is full prior to step 1016, then a victim cache line is selected from cache storage 914. The victim cache line is evicted to cache storage 904 in shared cache II 404(2), in an embodiment. However, note that in some embodiment, a condition for up-evicting cache lines is that utilization of the cache storage 914 is below a threshold.

Figure 11:
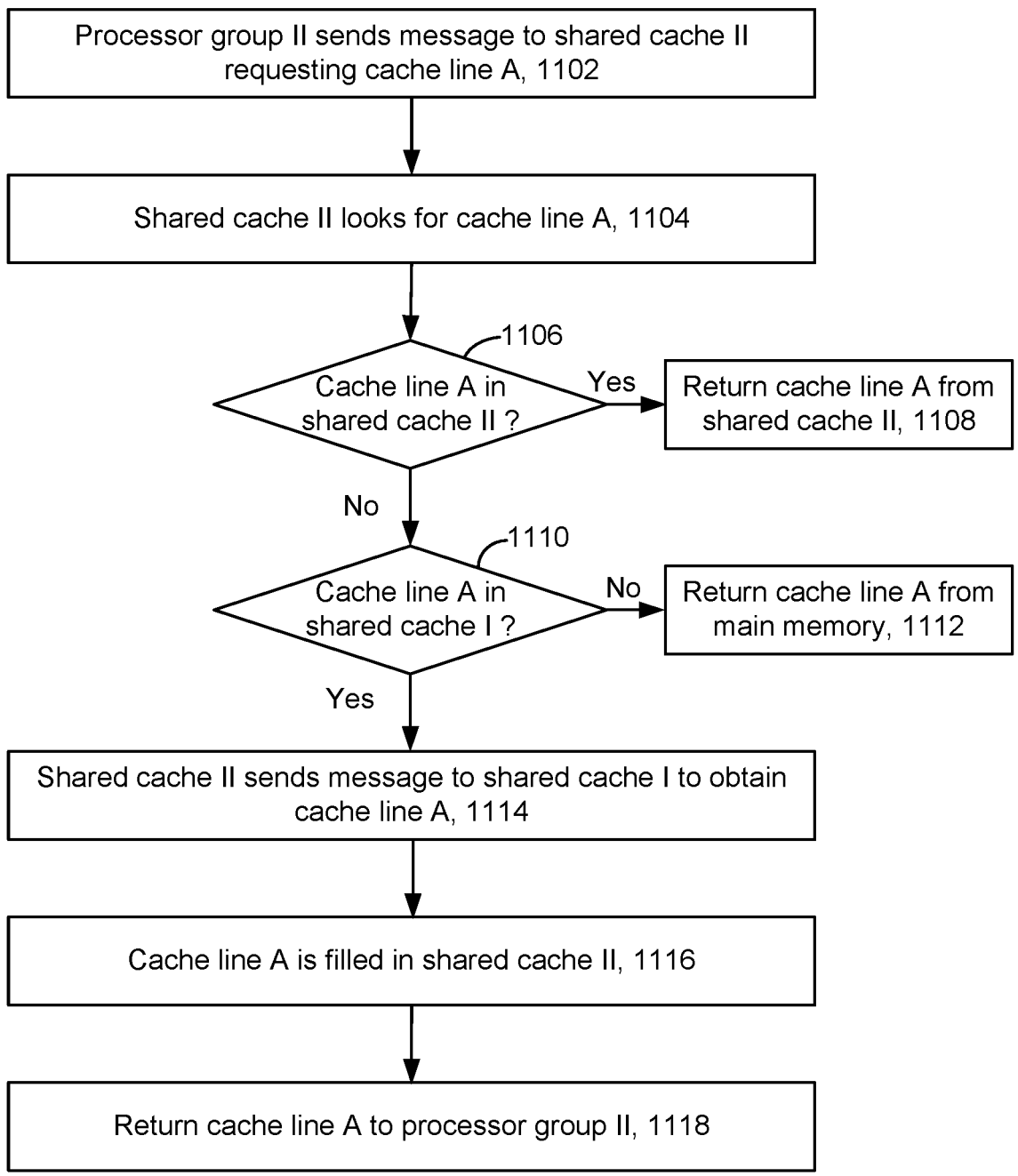
FIG. 11 is a flowchart of one embodiment of a process of obtaining a cache line that has been previously up-evicted.

FIG. 11 is a flowchart of one embodiment of a process 1100 of obtaining a cache line that has been previously up-evicted. Process 1100 continues on with the example in which cache line A was up-evicted from shared cache II 404(2) to shared cache 1404(1).

Step 1102 includes a processor in processor group II 402(2) sending a message to shared cache II 404(2) for cache line A. In one embodiment, the message is a Read-Shared command in the ARM AMBA Architecture. The ReadShared command is received by the cache controller in shared cache II 404(2), in an embodiment.

Step 1104 includes shared cache II 404(2) looking for cache line A. The message from step 1102 contains an address for cache line A. The cache controller in shared cache II 404(2) compares the address with an address field in the cache storage 904 to determine whether cache storage 904 contains cache line A. In one embodiment, the address includes a tag. Each entry in cache storage 904 has a tag field, in one embodiment. A controller may determine whether cache storage 904 contains cache line A by comparing the tag in the address (in the message) with the tag fields. Those of ordinary skill in the art will appreciate that there are multiple ways in which the tag can be used to look for cache lines.

In one embodiment, cache storage 904 is a multi-way set associative cache. For a multi-way set associative cache, the address may contain a tag, an index, and an offset. The cache controller may examine the tag and the index, as in known in the art, to determine whether the cache storage 904 contains cache line A. For example, the index may be used to determine what region (e.g., blocks) of the cache storage 904 should be examined. Optionally, the cache storage 904 could be fully associative. Optionally, the cache storage 904 could be direct mapped.

Step 1106 includes a determination of whether cache line A was found in cache storage 904 in shared cache II. If cache line A is found in cache storage 904, then cache line A is provided from cache storage 904 to the processor in processor group II 402(2), in step 1108.

If cache line A is not found in cache storage 904, then a determination is made in step 1110 whether cache line A is in cache storage 914 in shared cache I 404(1). The snoop filter in shared cache II 404(2) may be examined to determine whether another cache has cache line A. The snoop filter keeps track of coherency states of cache lines. Therefore, the snoop filter has a record of whether cache line A is in cache storage 914 in shared cache I 404(1). In the event that cache line A is not in cache storage 914 in shared cache I 404(1), then cache line A is provided from main memory 410 to the processor in processor group II 402(2), in step 1112.

In the event that cache line A is in cache storage 914 in shared cache I 404(1), then, in step 1114, the cache controller in shared cache II 404(2) sends a message to the cache controller in shared cache I 404(1) to obtain cache line A from cache storage 904. In one embodiment, a snoop command is sent. In one embodiment, the snoop command is one of the Snoop commands from the ARM AMBA Architecture.

Step 1116 includes storing cache line A (which was provided from shared cache I 404(1)) to cache storage 904 in shared cache II 404(2).

Step 1118 includes providing cache line A to the processor in processor group II 402(2).

Figure 12:
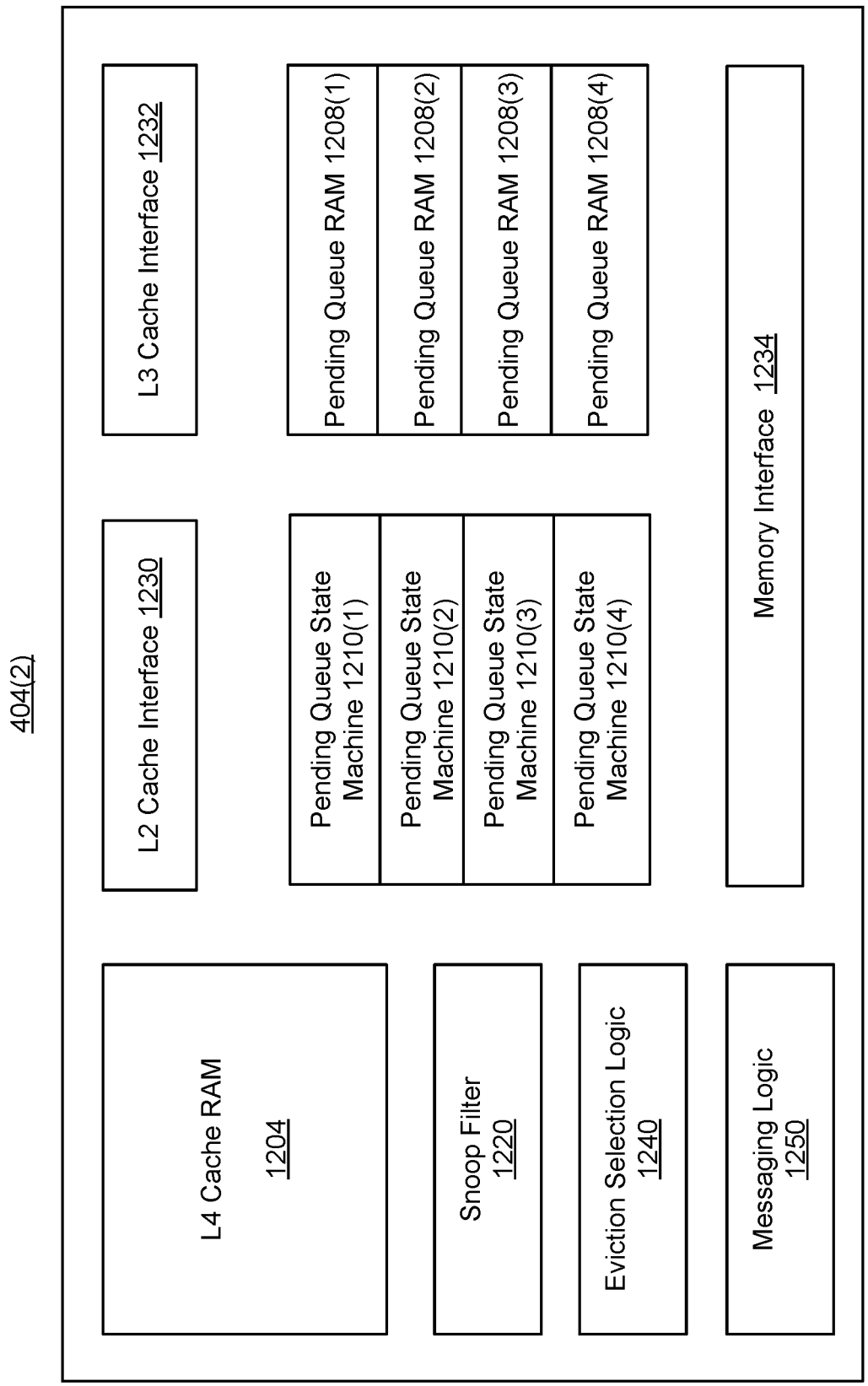
FIG. 12 is a block diagram of one embodiment of shared cache II.

FIG. 12 is a block diagram of one embodiment of shared cache II 404(2). In FIG. 12, the shared cache II 404(2) is an L4 cache. The shared cache II 404(2) can be used in computer system 400, but is not limited thereto. The shared cache II 404(2) of FIG. 12 has an L2 cache interface 1230 that is configured to interface with an L2 cache in processor group II 402(2). The L3 cache interface 1232 is configured to interface with shared cache I 404(1). In this example, shared cache I 404(1) is an L3 cache. The memory interface 1234 is configured to interface with main memory 410.

The L4 cache RAM 1204 that is used to store cache lines. The cache RAM may be used to implement cache storage 904 (see FIG. 9). In one embodiment, L4 cache RAM 1204 is eDRAM.

The pending queue RAM 1208 is used to store cache lines that are pending eviction from shared cache II 404(2). Pending queue RAM 1208 has four entries 1208(1), 1208(2), 1208(3), and 1208(4), for ease of illustration. There could be more or fewer entries.

Figure 13:
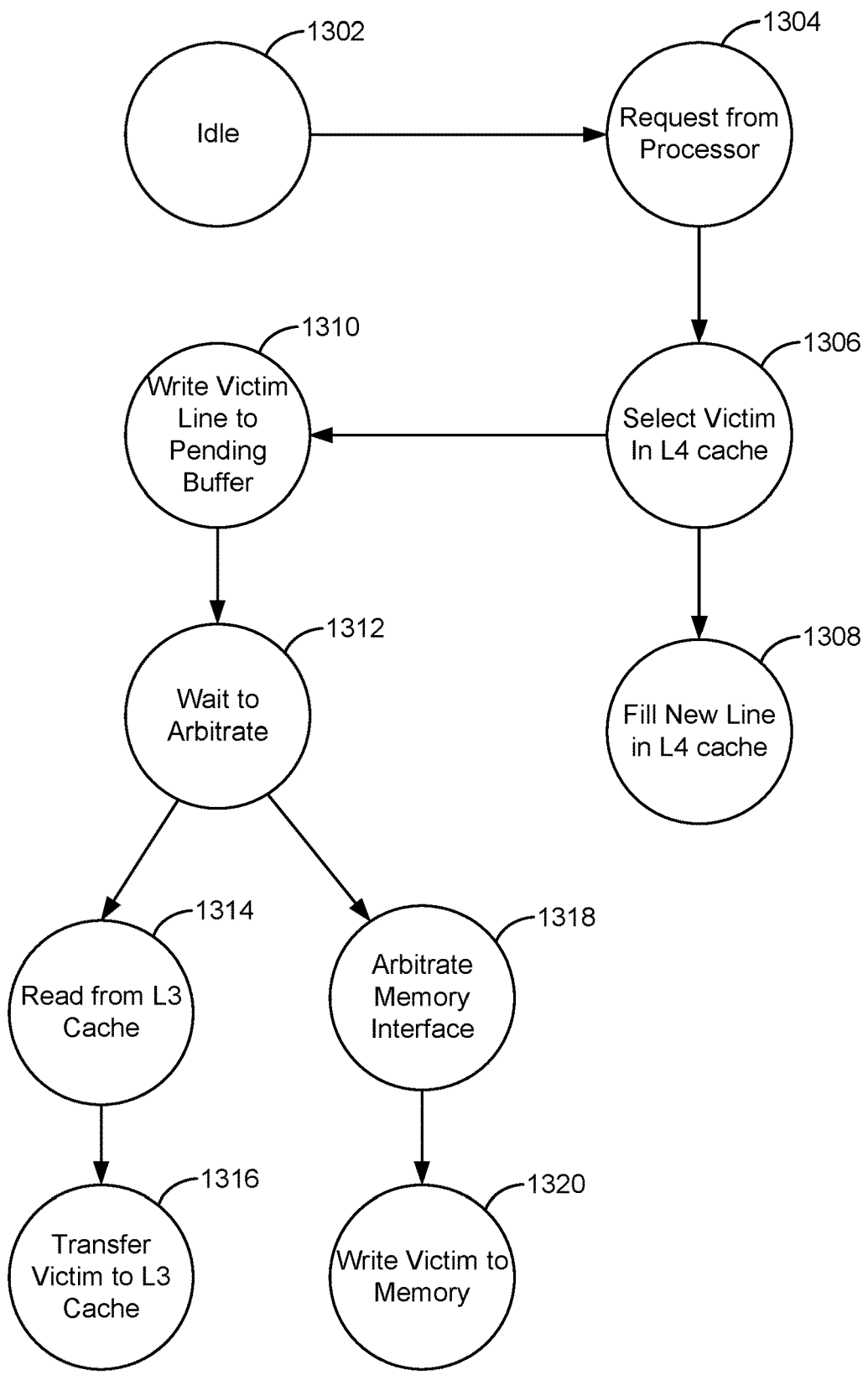
FIG. 13 is one embodiment of a state diagram for the pending queue state machine.

The pending queue state machine (SM) 1210 contains the logic that is used to control the pending queue RAM 1208. The state machine 1210 may be described as having a separate state machine for each pending queue RAM 1208 entry. Thus, pending queue SM 1210(1) corresponds to pending queue RAM 1208(1), pending queue SM 1210(2) corresponds to pending queue RAM 1208(2), pending queue SM 1210(3) corresponds to pending queue RAM 1208(3), and pending queue SM 1210(4) corresponds to pending queue RAM 1208(4). The combination of pending queue RAM 1208 and pending queue state machine 1210 are one embodiment of pending queue 908 (see FIG. 9). Further details of one embodiment of pending queue SM 1210 are depicted in FIG. 13.

The snoop filter 1220 keeps track of coherency states of cache lines in the cache hierarchy. Therefore, the snoop filter has a record of whether a cache line is in cache storage 914 in shared cache I 404(1).

The eviction selection logic 1240 is configured to select victim cache lines from L4 cache RAM 1204. The eviction selection logic 1240 is also configured to determine whether to up-evict a cache line, or to down-evict that cache line. In one embodiment, the eviction selection logic 1240 receives an indication of the cache utilization of the L3 cache to determine whether or not to up-evict to the L3 cache.

The messaging logic 1250 is configured to handle messages between the shared cache II 404(2) and other nodes, such as shared cache I 404(1), an L2 cache, a processor in a processor group etc. In one embodiment, the messaging logic 1250 is configured to send, receive, and process various messages in the ABMA CHI Architecture.

The shared cache II 404(2) may have other logic for controlling the cache, which is not expressly depicted in FIG. 12. The shared cache II 404(2) of FIG. 13 may be modified for used as shared cache II 404(2) of computer system 500 by, for example, replacing the memory interface 1234 with an interface to shared cache III 404(3).

Shared cache III 404(3) may have a similar design as the shared cache II 404(2) of FIG. 12, with replacing of the various interfaces (1230, 1232, 1234), as appropriate. Thus, shared cache III 404(3) may have a snoop filter, eviction selection logic, and messaging logic.

FIG. 13 is one embodiment of a state diagram for the pending queue state machine 1210. State 1302 is an idle state. State 1304 is entered when a request is received from a processor. An example of a request is CHI Request message in the ARM CHI Architecture.

State 1306 includes selection of a victim in the L4 cache. After the victim is selected two actions may be taken. State 1308 is to fill the new cache line into the L4 cache, in place of the victim. The second action is to write the victim line to the pending buffer (state 1310).

After writing the victim line to the pending buffer, there is a wait to arbitrate state (state 1312). State 1312 prevents the victim cache line from being down-evicted for a period of time. In the event that the L3 cache sends a message to read the victim cache line prior to the wait period being over, state 1314 is entered. State 1316 is to transfer the victim cache line to the L3 cache. In the event that the L3 cache fails to send a message to read the victim cache line before the wait period is over state 1318 is entered. State 1318 is to arbitrate for the memory interface. State 1320 is to write the victim cache line to memory after the memory interface is available.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a hierarchy of caches comprising a first cache having a first cache controller and a second cache having a second cache controller, the second cache below the first cache in the cache hierarchy;
   a first processor group; and
   a second processor group;
   the first cache controller configured to store cache lines evicted from the first processor group into the first cache and to down-evict cache lines from the first cache to the second cache;
   the second cache controller configured to store cache lines evicted from the second processor group into the second cache;
   the second cache controller configured to up-evict a first cache line from the second cache to the first cache in response to an eviction of a second cache line from the second processor group to the second cache; and
   the second cache controller configured to provide the up-evicted first cache line from the first cache to the second processor group in response to a request from the second processor group for the first cache line.

2. The apparatus of claim 1, wherein the second cache controller is configured to up-evict the first cache line from the second cache to the first cache in response to a determination that utilization of the first cache is below a threshold.

3. The apparatus of claim 1, wherein the second cache controller is further configured to prevent the first cache line in the second cache from being evicted to either a third cache below the second cache in the cache hierarchy or to main memory to allow the first cache line to be up-evicted to the first cache.

4. The apparatus of claim 1, wherein the second cache controller is further configured to:
   place the first cache line onto a pending queue in the second cache to be downward evicted from the second cache; and
   at least temporarily prevent the first cache line from being downward evicted from the pending queue in the second cache to allow the first cache line to be up-evicted to the first cache.

5. The apparatus of claim 1, wherein the second cache controller is configured to send a command from the second cache to the first cache to request the first cache to read the first cache line from the second cache in order to up-evict the first cache line from the second cache to the first cache.

6. The apparatus of claim 5, wherein the second cache controller is configured to send the command through a snoop channel between the first cache and the second cache.

7. The apparatus of claim 5, wherein the first cache controller is configured to fetch the first cache line from the second cache to the first cache in response to the first cache receiving the command.

8. The apparatus of claim 1, wherein the second cache controller is further configured to:
   determine whether the first cache line is in the second cache in response to a request for the first cache line from the second processor group; and
   send a request to the first cache for the first cache line in response to a determination that the first cache line is not in the second cache.

9. A computer-implemented method of up-eviction in a cache hierarchy, the method comprising:
   storing cache lines evicted from a first processor group into a first cache;

down-evicting cache lines from the first cache into a second cache below the first cache in the cache hierarchy;
storing cache lines evicted from a second processor group into the second cache;
up-evicting a first cache line from the second cache to the first cache in response to an eviction of a second cache line from the second processor group to the second cache, wherein the second cache line is evicted from the second processor group into the second cache;
receiving a request for the first cache line from the second processor group; and
providing the up-evicted first cache line from the first cache to the second processor group in response to the request for the first cache line from the second processor group.

10. The method of claim 9, further comprising:
determining that the first cache has a utilization below a threshold as a condition for up-evicting the first cache line from the second cache to the first cache.

11. The method of claim 9, further comprising:
placing the first cache line onto a pending queue in the second cache to be downward evicted from the second cache; and
preventing the first cache line from being downward evicted from the pending queue in the second cache to allow the first cache line to be up-evicted to the first cache.

12. The method of claim 9, further comprising
preventing the first cache line from being evicted from the second cache to either a cache that is below the second cache in the cache hierarchy or to main memory.

13. The method of claim 9, wherein up-evicting the first cache line from the second cache to the first cache comprises:
sending a command from the second cache to the first cache to request the first cache to read in the first cache line from the second cache.

14. The method of claim 13, wherein up-evicting the first cache line from the second cache to the first cache comprises:
fetching the first cache line from the second cache into the first cache in response to the command.

15. The method of claim 9, further comprising:
determining whether the first cache line is in the second cache in response to the request for the first cache line from the second processor group; and
sending a request from the second cache to the first cache for the first cache line in response to a determination that the first cache line is not in the second cache but is in the first cache.

16. A wireless communication device comprising:
a transceiver;
a first processor group;
a second processor group;
a first cache that is shared by the first processor group, the first cache having a first cache controller;
a second cache that is shared by the second processor group, the second cache having a second cache controller; and
the first cache controller configured to store cache lines evicted from the first processor group into the first cache and to down-evict cache lines from the first cache to the second cache;
the second cache controller configured to store cache lines evicted from the second processor group into the second cache;
the second cache controller configured to up-evict a first cache line from the second cache to the first cache in response to an eviction of a second cache line from the second processor group to the second cache; and
the second cache controller configured to provide the up-evicted first cache line from the first cache to the second processor group in response to a request from the second processor for the first cache line.

17. The wireless communication device of claim 16, wherein the second cache controller is configured to up-evict the first cache line from the second cache to the first cache in response to a determination that utilization of the first cache is below a threshold.

18. The wireless communication device of claim 16, wherein the second cache controller is further configured to:
place the first cache line onto a pending queue in the second cache to be downward evicted from the second cache; and
at least temporarily prevent the first cache line from being downward evicted from the pending queue in the second cache to allow the first cache line to be up-evicted to the first cache.

19. The wireless communication device of claim 16, wherein the second cache controller is further configured to:
send a command from the second cache to the first cache to request the first cache to read the first cache line from the second cache in order to up-evict the first cache line from the second cache to the first cache.

20. The wireless communication device of claim 19, wherein the first cache controller is configured to fetch the first cache line from the second cache to the first cache in response to the first cache receiving the command.

* * * * *